United States Patent
Mannava et al.

(10) Patent No.: US 11,256,623 B2
(45) Date of Patent: Feb. 22, 2022

(54) CACHE CONTENT MANAGEMENT

(71) Applicant: ARM Limited, Cambridge (GB)

(72) Inventors: Phanindra Kumar Mannava, Austin, TX (US); Bruce James Mathewson, Papworth Everard (GB); Jamshed Jalal, Austin, TX (US); Klas Magnus Bruce, Leander, TX (US); Michael Filippo, Austin, TX (US); Paul Gilbert Meyer, Austin, TX (US); Alex James Waugh, Cambridge (GB); Geoffray Matthieu Lacourba, Nice (FR)

(73) Assignee: ARM LIMITED, Cambridge (GB)

( * ) Notice: Subject to any disclaimer, the term of this patent is extended or adjusted under 35 U.S.C. 154(b) by 185 days.

(21) Appl. No.: 15/427,459

(22) Filed: Feb. 8, 2017

(65) Prior Publication Data

US 2018/0225214 A1    Aug. 9, 2018

(51) Int. Cl.
*G06F 12/0831* (2016.01)
*G06F 12/0808* (2016.01)

(52) U.S. Cl.
CPC ...... *G06F 12/0835* (2013.01); *G06F 12/0808* (2013.01); *G06F 2212/1024* (2013.01); *G06F 2212/621* (2013.01)

(58) Field of Classification Search
CPC ............. G06F 12/0862; G06F 12/0831; G06F 12/0833; G06F 12/0828
See application file for complete search history.

(56) References Cited

U.S. PATENT DOCUMENTS

| | | | | |
|---|---|---|---|---|
| 6,711,651 | B1* | 3/2004 | Moreno | G06F 12/0815 711/137 |
| 8,713,261 | B1* | 4/2014 | Aharoni | G06F 12/0868 711/137 |
| 10,482,062 | B1* | 11/2019 | Muniswamy Reddy | G06F 12/128 |
| 2006/0095679 | A1* | 5/2006 | Edirisooriya | G06F 12/0862 711/137 |
| 2008/0263279 | A1 | 10/2008 | Ramani et al. | |
| 2009/0031086 | A1* | 1/2009 | Carpenter | G06F 12/0822 711/146 |

(Continued)

OTHER PUBLICATIONS

Combined Search and Examination Report dated Jul. 3, 2018 in GB Application 1800453.1, 6 pages.

(Continued)

*Primary Examiner* — Nanci N Wong
(74) *Attorney, Agent, or Firm* — Nixon & Vanderhye, PC

(57) ABSTRACT

Apparatus and a corresponding method of operating a hub device, and a target device, in a coherent interconnect system are presented. A cache pre-population request of a set of coherency protocol transactions in the system is received from a requesting master device specifying at least one data item and the hub device responds by cause a cache pre-population trigger of the set of coherency protocol transactions specifying the at least one data item to be transmitted to a target device. This trigger can cause the target device to request that the specified at least one data item is retrieved and brought into cache. Since the target device can therefore decide whether to respond to the trigger or not, it does not receive cached data unsolicited, simplifying its configuration, whilst still allowing some data to be pre-cached.

21 Claims, 8 Drawing Sheets

(56) References Cited

U.S. PATENT DOCUMENTS

| | | | |
|---|---|---|---|
| 2013/0212321 A1* | 8/2013 | Talagala | G06F 21/565 |
| | | | 711/103 |
| 2016/0062890 A1* | 3/2016 | Salisbury | G06F 3/0613 |
| | | | 711/146 |
| 2017/0192921 A1* | 7/2017 | Wang | G06F 12/0811 |

OTHER PUBLICATIONS

Translation of Japanese Office Action for Application No. 2018-014685 dated May 25, 2021, 2 pages.

* cited by examiner

CACHE CONTENT MANAGEMENT

TECHNICAL FIELD

The present disclosure relates to a data processing system. More particularly it relates to the management of cache content in a data processing system.

BACKGROUND

The caching of copies of data items in a data processing system more closely to the point at which they are required for data processing operations (e.g. close to a CPU) enables the significant latency associated with a retrieval of data item from memory to largely be avoided. However, data caches must necessarily typically be much smaller than the memory devices they support and therefore the selection of the subset of data items from the memory device which are held in a cache device at any given time must be carefully administered in order to ensure that the caching works effectively. One mechanism by which data items may be populated in a cache is where a data access by a data processing component (e.g. a CPU) causes the data item to be retrieved from memory and the data item may then be stored in the local cache, on the assumption that having been retrieved once from memory it is likely to be accessed again in the near future. Alternatively, in particular in a multiple data processing component and multi-cache system, data items may be proactively pushed into a target data cache even before the processing component associated with that target cache requests the data item. This however requires the cache to have space available to accommodate this unsolicited data and administering such a system adds complexity to the administration of a cache.

SUMMARY

At least one example described herein provides a hub device for a coherent interconnect system comprising: interface circuitry to receive a cache pre-population request of a set of coherency protocol transactions from a requesting master device specifying at least one data item; and transaction control circuitry responsive to reception of the cache pre-population request to cause a cache pre-population trigger of the set of coherency protocol transactions specifying the at least one data item to be transmitted to a target device.

At least one example described herein provides a method of operating a hub device in a coherent interconnect system comprising: receiving a cache pre-population request of a set of coherency protocol transactions from a requesting master device specifying at least one data item and responding to reception of the cache pre-population request by causing a cache pre-population trigger of the set of coherency protocol transactions specifying the at least one data item to be transmitted to a target device.

At least one example described herein a master device for a coherent interconnect system comprising: a cache; interface circuitry to receive a cache pre-population trigger of a set of coherency protocol transactions from a hub device specifying at least one data item and cache control circuitry responsive to reception of the cache pre-population trigger to: determine whether to act on the cache pre-population trigger based on at least one further criterion; and when the cache control circuitry determines to act on the cache pre-population trigger to cause a cache populating transaction of the set of coherency protocol transactions specifying the at least one data item to be sent from the interface circuitry to cause the at least one data item to be cached in the cache.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
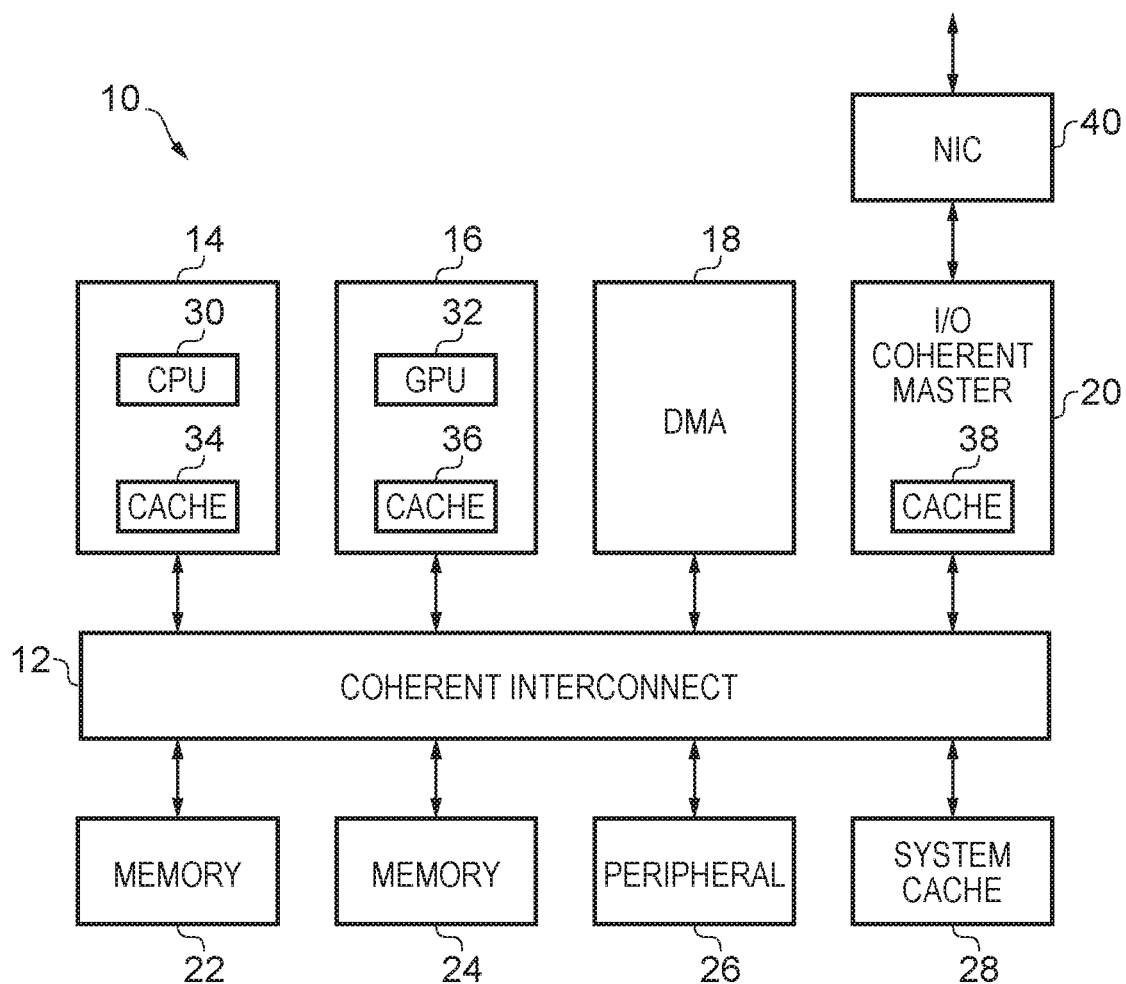
FIG. 1 schematically illustrates a coherent interconnect system of one embodiment with multiple master devices and multiple slave devices.

In some example embodiments there is a hub device for a coherent interconnect system comprising: interface circuitry to receive a cache pre-population request of a set of coherency protocol transactions from a requesting master device specifying at least one data item; and transaction control circuitry responsive to reception of the cache pre-population request to cause a cache pre-population trigger of the set of coherency protocol transactions specifying the at least one data item to be transmitted to a target device.

The hub device for a coherent interconnect system, which may therefore be a coherent interconnect component which connects together a number of different devices making up the rest of the system, is thus arranged to be responsive to a new type of request which may be received from a particular master device in the system and forms part of a set of coherency protocol transactions which the devices of the coherent interconnect system are arranged to exchange with one another. This cache pre-population request received from a requesting master device indicates at least one data item and in response the transaction control circuitry of the hub device causes a cache pre-population trigger (which also forms part of the set of coherency protocol transactions which the devices of the system are arranged to exchange with one another) to be transmitted to a target device in the system specifying the at least one data item. Accordingly, it should be noted that what the transaction control circuitry causes to be sent to the target device, at least in the first instance, is a cache pre-population trigger, and not the at least one data item itself. Nevertheless, the cache pre-population trigger specifies the at least data item and hence in response the target device can itself assess whether it wishes to respond to the cache pre-population trigger in order to cause that at least one data item to be brought into its cache. This would pre-populate its cache with this at least one data item in advance of this at least one data item being required. However it should be noted that the response of the target device to the cache pre-population trigger may also depend on the nature of the target device. The above example pre-supposes that the target device is a master device, but in other examples it may be a slave device, such as a memory, which may respond to the cache pre-population trigger by providing the specified data item(s), i.e. to be cached elsewhere.

When target device does perform a determination of how to react to the cache pre-population trigger, it may assess whether it should do this according to a range of criteria. These may for example be how busy the cache currently is and whether the request is of a type that it can handle, and may make use of various data such as stored indications of data addresses previously accessed and when those addresses were accessed, heuristics for how often responding to previous triggers resulted in useful data being stored in the cache, and so on. Overall therefore it is in particular to be noted that this mechanism for causing at least one data item to be pre-populated in a target cache does not push data unsolicited into the target cache, but rather "suggests" to the cache that it could choose to pre-populate with the specified at least one data item. This therefore avoids the need for reservation of available storage space in a cache in anticipation of unsolicited data being pushed onto it from another system component and the associated administrative mechanisms necessary to support the handling of the reception of such unsolicited data items. Nevertheless a mechanism is provided by which one system component (the requesting master device) can use knowledge that it has about data processing taking place within the system as a whole to cause such a pre-population "suggestion" to be made to another system component (the target device) and greater efficiency of the data processing carried out by the system as a whole can therefore result.

It is envisaged that the target device which is the recipient of the cache pre-population trigger transmitted from the hub device could take a wide variety of forms within the system, and many different types of devices could be configured to be responsive to such a cache pre-population trigger. However, in some embodiments the target device is a target master device comprising a cache and the cache pre-population trigger indicates that the target master device should determine whether to cause a copy of the at least one data item to be retrieved into its cache. Further, the determination of whether to cause the copy of the at least one data item to be retrieved into the cache may be carried out in a number of different ways in such a target master device comprising a cache, whether strictly speaking by the target master device itself, or by the cache itself (or at least control circuitry directly associated therewith) or a combination of the two. Either way, it will be appreciated following the above discussion that it is a local determination at the target master device which determines whether a copy of the at least one data item should be caused to be retrieved. Further therefore it should also be appreciated that the target device may simply chose to ignore the cache pre-population trigger, for example when it is currently too busy or too full to accommodate this at least one data item.

The requesting master device which issues the cache pre-population request may do so when it has a cached copy of the least one data item available in its own cache. For example, the cache pre-population request may take the form of a write request issued by the requesting master device following its own local processing on its cached copy of the at least one data item. Accordingly, if the target device chooses to respond to the cache pre-population trigger by requesting a copy of the at least one data item in such an embodiment the cached copy held by the requesting master device may provide that copy and avoid the latency of a retrieval from memory. Accordingly, in some embodiments the cache pre-population request specifies that the requesting master device has a cached copy of the at least one data item available.

Alternatively, in some embodiments the cache pre-population request specifies that the at least one data item is to be retrieved from a further slave device where the at least one data item is stored. Thus in such embodiments the requesting master device can indicate that it does not have a cached copy of the at least one data item available (or at least it is inappropriate for the target device to be provided with that copy) and it can choose to specify the location (the further slave device) from which the data item is to be retrieved.

This kind of cache pre-population request which specifies a further slave device from which the data item is to retrieved may be sent to a variety of recipients, whether to another master device which itself can then choose to request that the at least one data item is retrieved from the further slave device, or in other embodiments the cache pre-population request could be sent to the further slave device itself. Hence in some such embodiments the target device is the further slave device and the cache pre-population trigger indicates that the further slave device should return a copy of the at least one data item to the hub device. In other words it will be appreciated that in such an embodiment the ultimate destination of the at least one data item (for data processing) is not specified by the requesting master device and this mechanism causes the at least one data item to be retrieved to the hub device and, for the time being, possibly no further. Memory latency is nevertheless reduced by causing the data item(s) to be cached closer to where it or they will later be required. The hub device may be provided with its own local storage such as a buffer or cache in order to hold such data item copies which it can then in due course provide to other devices in the system.

Hence it is envisaged that the cache pre-population request may or may not include a specification of a target device. In some embodiments the cache pre-population request specifies the target device, whilst in other embodiments the cache pre-population request does not specify the target device. Not specifying the target device may be implemented in a variety of ways which are appropriate to the defined set of coherency protocol transactions, but in some embodiments a field provided in the cache pre-population request to specify the target device indicates an invalid target device identifier.

The hub device may respond in a variety of ways to a cache pre-population request which does not specify the target device (or at least where an invalid target device identifier is indicated), but in some embodiments the transaction control circuitry is responsive to reception of the cache pre-population request to cause the cache pre-population trigger to be transmitted to a further slave device where the at least one data item is stored, thereby to cause the at least one data item to be cached in a cache associated with the hub device. Accordingly, the hub device can have the ability, where no target device is specified in the cache pre-population request received, to add a target itself which may for example be a slave device where the at least one data item is stored, which as explained above can then respond to the trigger simply by providing the at least one data item. Moreover, this then can cause the at least one data item to be cached in a cache associated with the hub device. This cache may take a variety of forms but may for example be a system cache connected to the hub device.

It is however envisaged that it is not necessary for the retrieval of the at least one data item from a further slave device to result in the at least one data item being stored at or near the hub device and in some embodiments the transaction control circuitry is responsive to reception of the cache pre-population request to cause the cache pre-population trigger to be transmitted to a further slave device where the at least one data item is stored, thereby to cause the at least one data item to be stored in a temporary storage device situated between the further slave device and the hub device. This temporary storage device may for example be another cache, such as a level three (L3) cache situated between the further slave device (e.g. memory) and the hub device, it could also be a variety of buffer provided for this purpose, or any other form of temporary storage device in order to hold the at least one data item nearer (i.e. with lower retrieval latency with respect to the hub device) to the hub than the further slave device.

In other embodiments the transaction control circuitry is responsive to reception of the cache pre-population request which does not specify the target device to select the target device to which the cache pre-population trigger is transmitted. Accordingly, the hub device can specify a target device, for example such as a master device with a dedicated cache in the system, to which the pre-population trigger is transmitted.

The hub device may choose the target device according to a number of different criteria, but in some embodiments the hub device further comprises data access pattern circuitry to store data access patterns for connected master devices, and the transaction control circuitry is arranged to select the target device in dependence on the data access patterns. This enables the hub device to determine a target device where it may expected, based on those data access patterns, that this at least one data item will soon be useful. The data access patterns themselves may take a variety of forms, but may for example be provided as a table of threads, a range of addresses, and so on.

In some such embodiments the data access patterns comprise indications of when the connected master devices have accessed data represented in the data access patterns. In other words, the data access patterns in such embodiments further comprise a temporal component, enabling the hub device to better judge which connected master device is most likely benefit from pre-population of its cache with this at least one data item on the basis that it has, for example, most recently accessed this at least one data item.

A hub device in a coherent interconnect system may comprise snoop filter circuitry to enable it to perform a role in snoop operations which must take place within the system in order to maintain the required coherency, and in some embodiments the hub device can make further use of this snoop filter circuitry and the indications of cached data which it stores when selecting the target data device to which the cache pre-population trigger is transmitted. For example, if the indications of cache data stored in the snoop filter circuitry indicate that a target device already holds a valid, up-to-date copy of the at least one data item, then the hub device will not unnecessarily cause the cache pre-population request to be transmitted to this target device. Further, the indications of cached data stored in the snoop filter circuitry may also indicate the coherency status of cached data items held by the connected master devices and the coherency status of a cache copy of the at least one data item may also be used to suppress transmission of the cache pre-population trigger to the target device, such as when the target device holds a "unique" copy of the data, but the cache pre-population request has indicated that a "shared" copy of the at least one data item is its subject.

Accordingly, in some embodiments the cache pre-population request specifies a coherency state with which the at least one data item is to be labelled when cached. Generally, the requesting master device may be able to improve efficiency of the system by specifying the coherency state, in dependence on its knowledge of, for example, whether the data will likely only be read or may be modified.

Thus, in some such embodiments the coherency state is a modifiable state indicating that, when the at least one data item is cached, the at least one data item is allowed to be updated without further exchange of coherency protocol transactions with the coherent interconnect system. This may for example be labelled as a "unique" coherency state which can be beneficial when it is expected that the associated processing device will want to modify the content of the corresponding cache line (i.e. the at least one data item when cached).

In other such embodiments the coherency state is a non-modifiable state indicating that, when the at least one data item is cached, further exchange of coherency protocol transactions with the coherent interconnect system is required before the at least one data item is allowed to be updated. This may for example be labelled as a "shared" coherency state, which may be used when it is anticipated that the associated processing device will only require the cache line (i.e. the cached at least one data item) for reading, and then it may be beneficial to ensure that this cache line (i.e. the at least one data item) is cached in a state labelled this way such that other copies of the line in other devices do not need to be invalidated.

In some example embodiments there is a method of operating a hub device in a coherent interconnect system comprising: receiving a cache pre-population request of a set of coherency protocol transactions from a requesting master device specifying at least one data item; and responding to reception of the cache pre-population request by causing a cache pre-population trigger of the set of coherency protocol transactions specifying the at least one data item to be transmitted to a target device.

In some example embodiments there is a master device for a coherent interconnect system comprising: a cache; interface circuitry to receive a cache pre-population trigger of a set of coherency protocol transactions from a hub device specifying at least one data item; and cache control circuitry responsive to reception of the cache pre-population trigger to: determine whether to act on the cache pre-population trigger based on at least one further criterion; and when the cache control circuitry determines to act on the cache pre-population trigger to cause a cache populating transaction of the set of coherency protocol transactions specifying the at least one data item to be sent from the interface circuitry to cause the at least one data item to be cached in the cache.

Some particular embodiments will now be described with reference to the figures.

FIG. 1 schematically illustrates a data processing system 10 in which the present techniques are implemented in one embodiment. As can be seen from the figure this is a relatively heterogeneous system comprising a number of different master devices and a number of different slave devices, but other embodiments could equally be much more homogeneous. The master devices shown in FIG. 1 comprise a central processing device 14, a graphics processing device 16, a direct memory access device (DMA) 18, and an I/O coherent master 20. This I/O coherent master 20 provides a bridge to the network interface card (NIC) 40 for communication with a further network (not illustrated). The slave devices illustrated in the example of FIG. 1 comprise memories 22 and 24, peripheral 26, and system cache 28. Communication and data transfer between all these devices is mediated by the coherent interconnect 12, which is also variously referred to herein as a home node or a hub device. As can also be seen in the figure, the CPU device 14 is shown to comprise a specific CPU block 30 and an associated local (i.e. L1) cache 34, the graphics processing device 16 is shown comprising a specific GPU block 32 and a local (L1) cache 36, and the I/O coherent master 20 is also provided with its own local (L1) cache 38. The communications between the illustrated devices in FIG. 1 take the form of defined format messages from a set a coherency protocol transactions which enable coherency of the multiple copies of data items stored in multiple locations around the illustrated system to be maintained. This set of coherency protocol transactions may be variously defined as is appropriate to the system under consideration, but one such suitable example is the AMBA® 5 CHI (coherent hub interface) specification provided by ARM® Limited of Cambridge UK. The techniques disclosed herein relate to the manner in which a set of coherency protocol transactions may be defined to enable such a specification to further allow the pre-population of caches in a system in which the specification is implemented, as will be described in more detail below with reference to the figures which follow.

Figure 2:
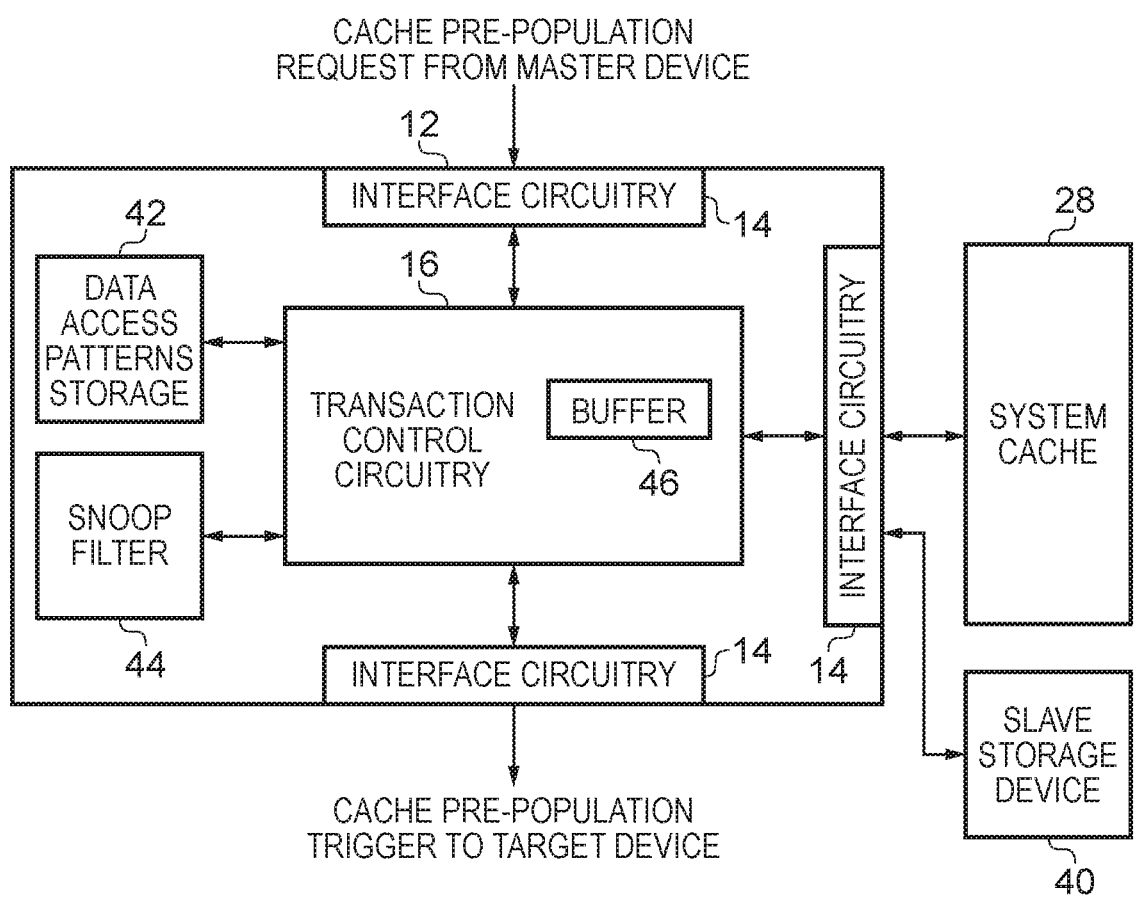
FIG. 2 schematically illustrates some components of a hub device in a coherent interconnect system in one embodiment.

FIG. 2 schematically illustrates some components of a coherent interconnect device (i.e. a home node or hub device) such as that represented by the coherent interconnect 12 in FIG. 1. This hub device is shown in FIG. 2 to comprise interface circuitry 14 which is illustrated in the figure by three separate components to facilitate visual understanding, but these portions of the interface circuitry may not in fact be physically separate from one another in some embodiments, depending on the particular devices to which an interface must be provided. The interface circuitry 14 is arranged to receive a cache pre-population request from a master device in the system and this is passed on to the transaction control circuitry 16. In response to the reception of the cache pre-population request the transaction control circuitry causes a cache pre-population trigger to be issued to a target device via the interface circuitry 14. This target device can (in this embodiment) in principle be any of the devices connected to the interconnect 12 in FIG. 1. As will be described in more detail below, in response to reception of this cache pre-population trigger the target device (e.g. a master device and/or it cache) may choose to request that the at least one data item specified in the cache pre-population trigger is caused to be retrieved for temporary storage in that cache. In other examples the target device is a slave device such as the memories 22 and 24 as shown in FIG. 1, and thus the cache pre-population trigger can cause one of these slave devices to return a copy of the at least one data item specified in the cache pre-population request such that the at least one data item can then be stored in any location within the system: e.g. on the path between the memory and the coherent interconnect, in the coherent interconnect, in a storage device associated with the coherent interconnect (such as the system cache 28), or forwarded by the coherent interconnect 12 to any of the master devices which comprises a cache.

Accordingly, as is shown in FIG. 2, the hub device is connected via its interface circuitry 14 to both a system cache 28 and a slave storage device 40 (which may in fact be one of the memories 22 or 24 shown in FIG. 1). The hub device 12 further comprises data access patterns storage 42 to which the transaction control circuitry 16 can refer, which may for example do when the cache pre-population request received from a requesting master device does not specify the target device. The transaction control circuitry may then be able to determine an appropriate target device to which the cache pre-population trigger should be transmitted on the basis of the data access patterns stored in the data access pattern storage 42. The data access patterns storage 42 could store various different types of data, but in this embodiment it is envisaged that it comprises a range of addresses and an indication of when those addresses were accessed along with the master devices making such access. Hence the transaction control circuitry on receipt of a cache pre-population request specifying a given data item (by means of its memory address) can refer to the range of addresses stored in a data access patterns storage 42 and determine if an indication is stored therein of a master device which has recently accessed that data item and therefore represents a good candidate to be the target device to which the cache pre-population trigger is then transmitted.

However, the transaction control circuitry 16 shown in FIG. 2 also has reference to snoop filter circuitry 44 and can make use of the information stored therein in determining whether to forward a cache pre-population trigger to a target device at all and/or which target device should receive the cache pre-population trigger (if this is not specified in the received request). The provision of a snoop filter within a coherent interconnect is known to one of ordinary skill in the art and detailed description thereof is not made here, purely for the purposes of brevity. However, where the snoop filter circuitry contains stored indications of data items which are cached in various locations in the system and the coherency status of those items, this information is made use of by the transaction control circuitry in the context of the present techniques, for example, where the cache pre-population request received specifies a target device and information in the snoop filter circuitry indicates that the specified target device already holds a valid copy of the at least one data item. It may be concluded then that no cache pre-population trigger need be sent to that target device. In other examples, a cache pre-population trigger may be prevented from being sent to a target device where a specified coherency status for a data item in the cache pre-population request is incompatible with a cache coherency status for that data item stored in another cache in the system and recorded in the snoop filter circuitry 44. For example, where the cache pre-population request specifies that the cache pre-population trigger should (if acted on) cause the at least one data item to have a "unique" status but the content of the snoop filter indicates that the data item is already stored as "unique" in another location, then transmission of the cache pre-population trigger to the specified target device is not made, since a request by that target device for a unique copy of the data item could not currently be fulfilled. Finally, the transaction control circuitry 16 is illustrated as also comprising a buffer 16, which enables the hub device 12 to temporarily hold copies of data items which are in transition between other devices in the system.

Figure 3:
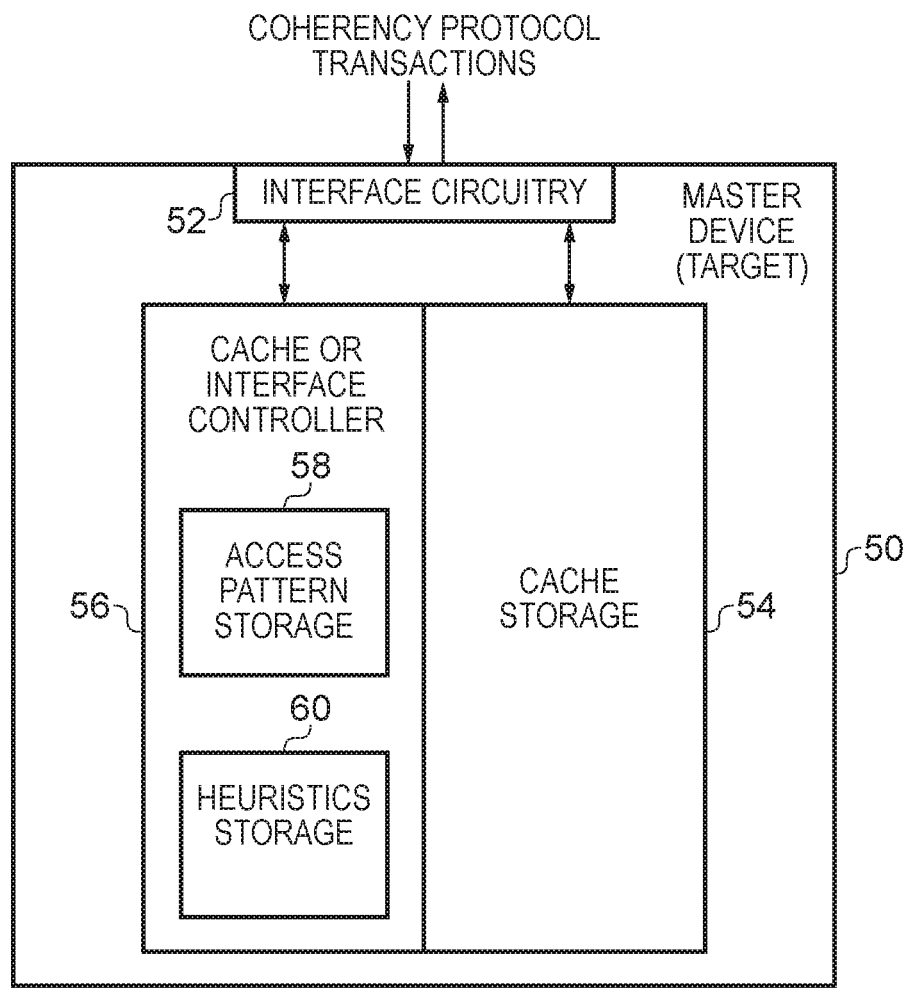
FIG. 3 schematically illustrates some components of a master device in one embodiment.

FIG. 3 schematically illustrates a master device 50 which is an example of the above referred to target device, i.e. the recipient of a cache pre-population trigger. The master device 50 comprises interface circuitry 52 via which it exchanges coherency protocol transactions with other components of the system via the coherent interconnect. Within the master device 50 is generally illustrated a cache, which is shown in the figure as comprising the cache storage 54 and its associated cache controller 56. However, as shown in the figure component 56 may in fact be provided as an interface controller and either a cache controller or an interface controller could process the cache pre-population trigger received via the interface circuitry 52. Either way, in the embodiment illustrated this controller comprises access pattern storage 58 and a heuristics storage 60. Essentially, on receipt of the cache pre-population trigger the controlling portion associated with the cache decides whether to act on that trigger and issue a request for the specified data item or items to be retrieved from elsewhere in the system and stored in the cache storage 54. This decision making process can be implemented hierarchically in that at a first decision level the controller must decide if the cache is even capable of responding to the particular cache pre-population trigger (in the form of a coherency protocol transaction) received. If it is not, then the processing simply ends at that point. At a next level of decision making the controller can determine whether the cache is currently too busy or does not have available space (or at least cache victims it is willing to evict) in order to accommodate the proposed data item(s). Then finally the controller can reference its access pattern storage 58 and/or its heuristics storage 60 to determine whether to respond to the cache pre-population trigger or not. The access pattern storage 58 can comprise, for example, a table of threads and associated addresses which those threads will access, such that the controller can decide based on the current processing being carried out on this master device whether the data item(s) specified falls within a range of addresses which it expects to be accessed in the near future by a current or upcoming thread. Alternatively, or in addition, the access pattern storage may store a range of addresses and associated temporal indications, showing when certain memory addresses or ranges of memory addresses have recently been accessed and the controller can then decide on that basis whether it is deemed worthwhile to proactively retrieve the at least one data item into the cache. The heuristics storage 60 can be configured on a statistical basis to indicate how often a positive response to a trigger request (either generally or for specific addresses or address ranges) has resulted in a cached data item being useful to the master device (i.e. that data item was caused to be stored in the cache shortly before the master device requested it). These indications can then guide thresholds defined within the controller for the decision as to whether to respond to a given received cache pre-population trigger or not.

Figure 4:
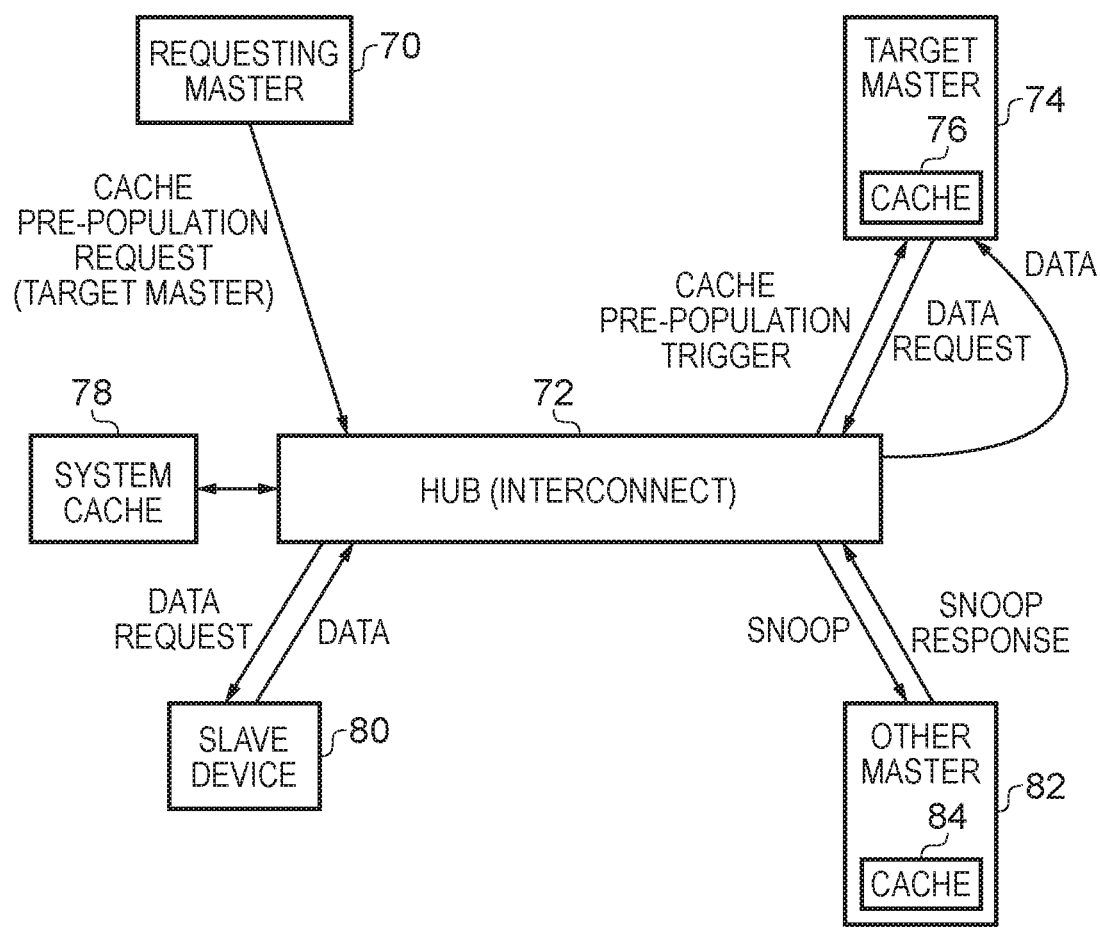
FIG. 4 schematically illustrates the interaction of a hub device with a requesting master, a target master, a slave device, and another master in one embodiment.

FIG. 4 schematically illustrates some components of a data processing system and their interactions to illustrate the overall principle of how some of the system components may interact with one other according to the present techniques. In this system, a requesting master 70 issues a cache pre-population request which is transmitted to the hub device (the interconnect) 72. This example cache pre-population request does specify a target master. On receipt of the cache pre-population request the hub device 72 identifies the specified target and causes a cache pre-population trigger to be transmitted to that target. In the example shown in FIG. 4 this is the target master 74 which comprises its own L1 cache 76. In response (as for example described above with reference to FIG. 3) the target master determines whether to respond to the cache pre-population trigger or not. When it does a corresponding data request is returned to the hub device 72. In response to this data request the hub device 72 can retrieve the specified data either from its locally accessible system cache 78, or by means of sending a data request to a slave storage device 80 which then returns the data to the hub device. Depending on the coherency status of the requested data item, the hub device 72 may also send a snoop request to (at least one) other master device 82 in the system which also comprises its own local cache 84 and in response the other master device provides a snoop response which the hub device 72 can factor in to its determination as to how it responds to the data request received from the target master 74. Thus finally, if the retrieval of the data from the slave device and the snoop response from the other master allow, the data is then forwarded from the hub device 72 to the cache 76 of the target master 74.

Figure 5:
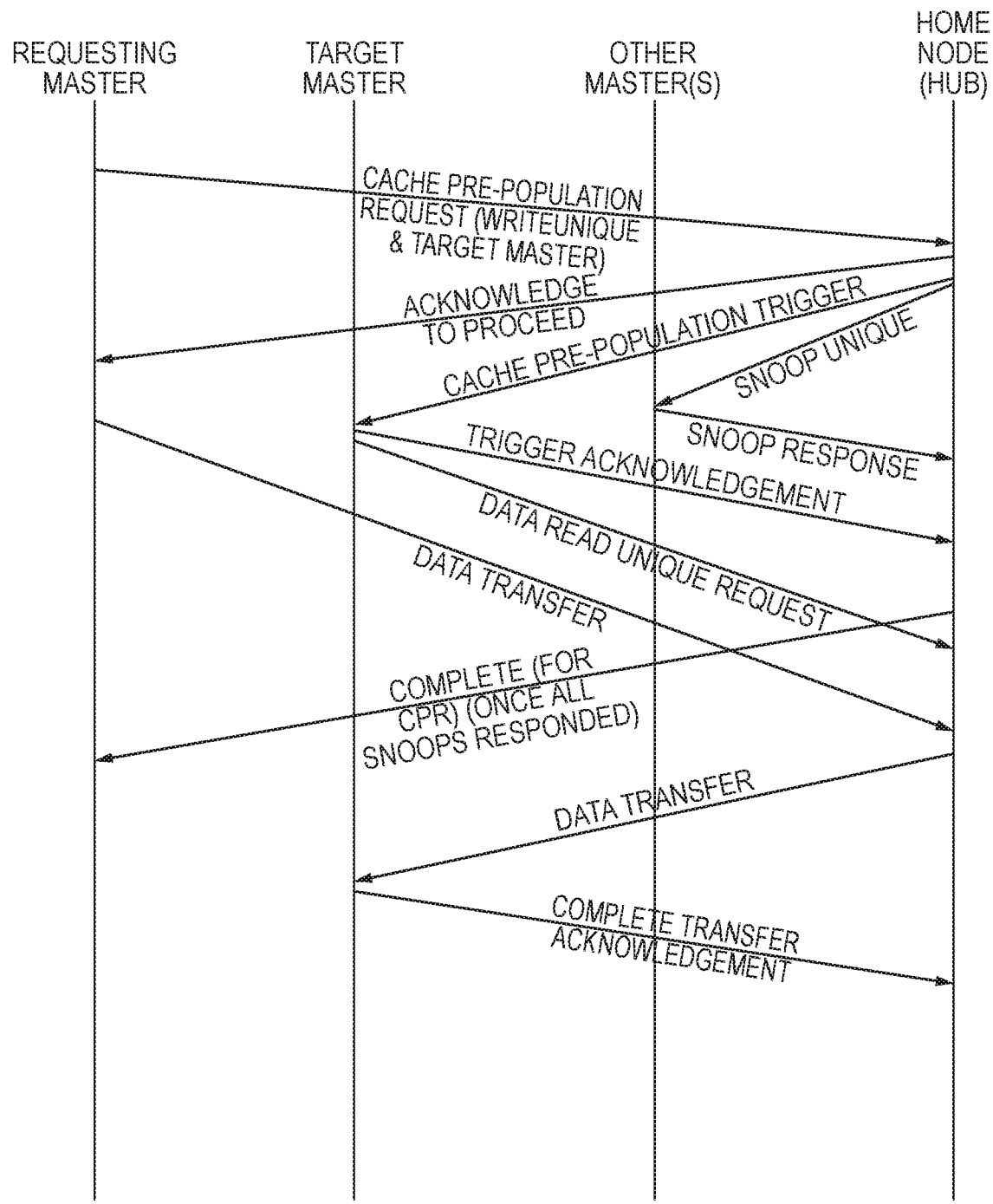
FIG. 5 shows an example set of communication messages exchanged between a requesting master, a target master, another master, and a home node (hub device) in one embodiment.

FIG. 5 shows an example set of communications (coherency protocol transactions) which are exchanged between devices of a coherent interconnect system in one example. This particular example illustrates a situation when the requesting master sends the home node (hub device) a transaction which is a cache pre-population request categorised as "WriteUnique" and specifying a target master device. One of ordinary skill in the art will recognise this terminology from the AMBA® specifications provided by ARM® Limited of Cambridge, UK It is important therefore to note that this disclosure is making use of known terminology as the basis for the description of this transaction, to facilitate one of ordinary skill in the art's understanding, but this disclosure is then augmenting such a transaction in accordance with the techniques presented for the first time herein (i.e. to make it a cache pre-population request). In response to this the home node sends the requesting master an acknowledgement to proceed unless it does not currently have space available to receive the data (specified by the requesting master in this write request). The home node also send a cache pre-population trigger specifying the data item(s) specified in the cache pre-population request to the target master and also issues a "SnoopUnique" to (at least one) other master in the system, which then responds with a corresponding snoop response. In response to the cache pre-population trigger the target master issues a trigger acknowledgement (indicating that it has correctly received the trigger message) and in the example of FIG. 5 the target master decides to act on the trigger and further issues a "ReadUnique" data request to the home node. The requesting master, having received the acknowledgement to proceed from the home node begins data transfer of the specified data item(s) to the home node. Once all snoop responses have been received by the home node the home node issues a completion response to the requesting master indicating that actions related to the cache pre-population request have now been completed. Further, once the home node has received the data from the requesting master it begins transfer of that data to the target master which responds with a complete transfer acknowledgement. The data item(s) specified by the requesting master in its WriteUnique has thus been transferred to the home node (and may from there be written out to memory if appropriate) and further this data has also been provided to the target master for pre-populating its cache.

Figure 6:
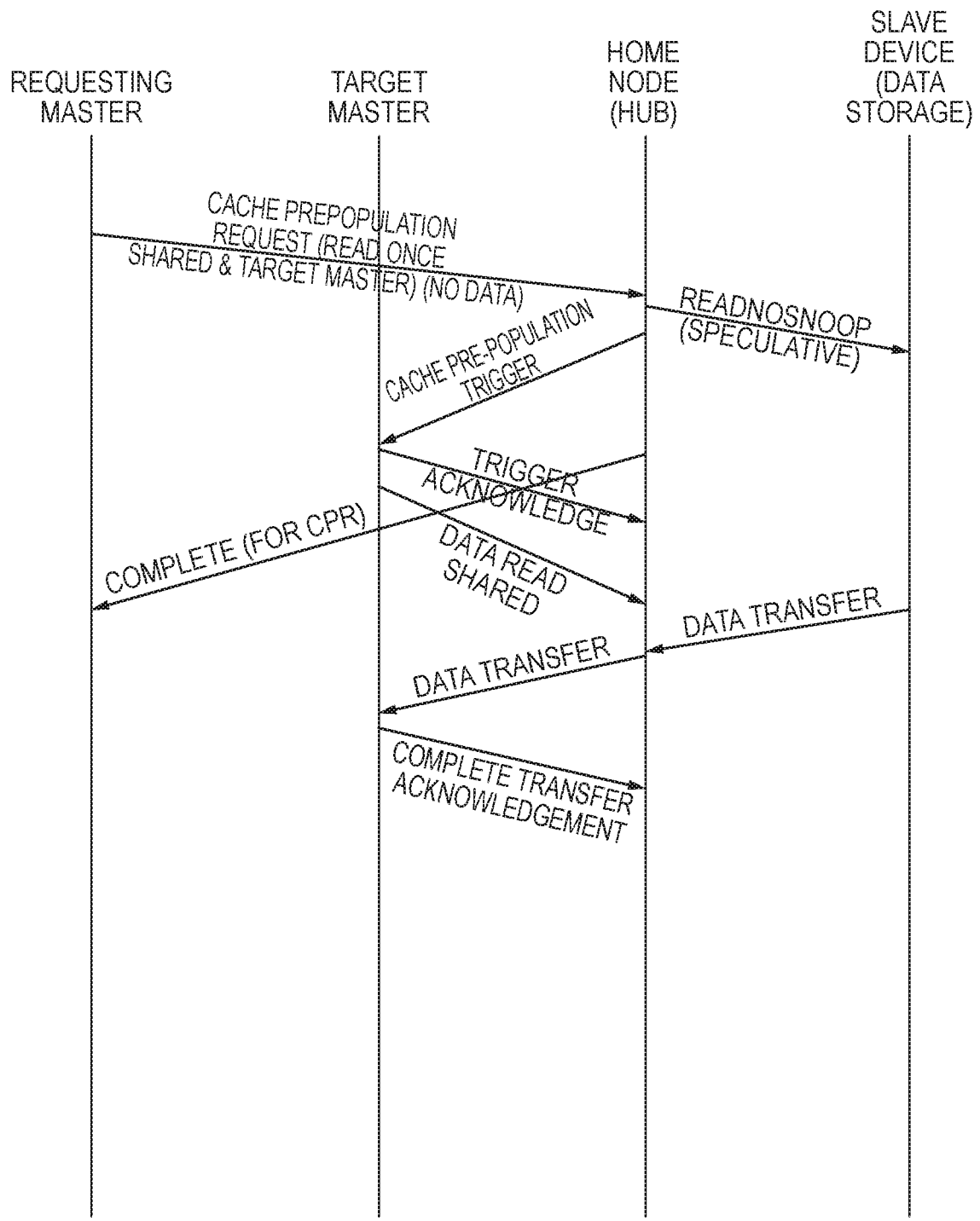
FIG. 6 shows an example set of communication messages exchanged between a requesting master, a target master, a home node (hub device), and a slave data storage device in one embodiment.

FIG. 6 shows an example of communications between system components in an example where the requesting master issues a cache pre-population request based on the protocol for a read transaction categorised as a "ReadOnceShare" transaction, which specifies the target master but does not provide any data. As mentioned above, it is again important to note this use of known terminology as the basis for the description of this transaction is merely to facilitate one of ordinary skill in the art's understanding, but this disclosure is augmenting such a transaction in accordance with the techniques presented for the first time herein (i.e. to make it a cache pre-population request). On reception of this type of cache pre-population request the home node generates a cache pre-population trigger which is transmitted to the specified target master and, in the example shown, the home node speculatively already issues a "ReadNoSnoop" transaction to the slave device where the specified data is stored. It is to be noted that this read is speculative, since it is not yet known whether the target master will in fact respond to the trigger and request the data, but latency can be reduced by such a speculative read. In response to the reception to the cache pre-population trigger, the target master issues a trigger acknowledge to the home node and then, when it chooses to act on the trigger, issues a "ReadShared" transaction to the home node. At around this time, the home node also acknowledges the cache pre-population request transaction to the requesting master with a complete signal, once it has issued the cache pre-population trigger to the target master. In response to the ReadNoSnoop the slave device transfers the requested data to the home node, which then forwards that data to the target master on receipt. Finally, the target master, when it has received the data (and populated its cache therewith), issues a complete transfer acknowledgement to the home node.

Figure 7:
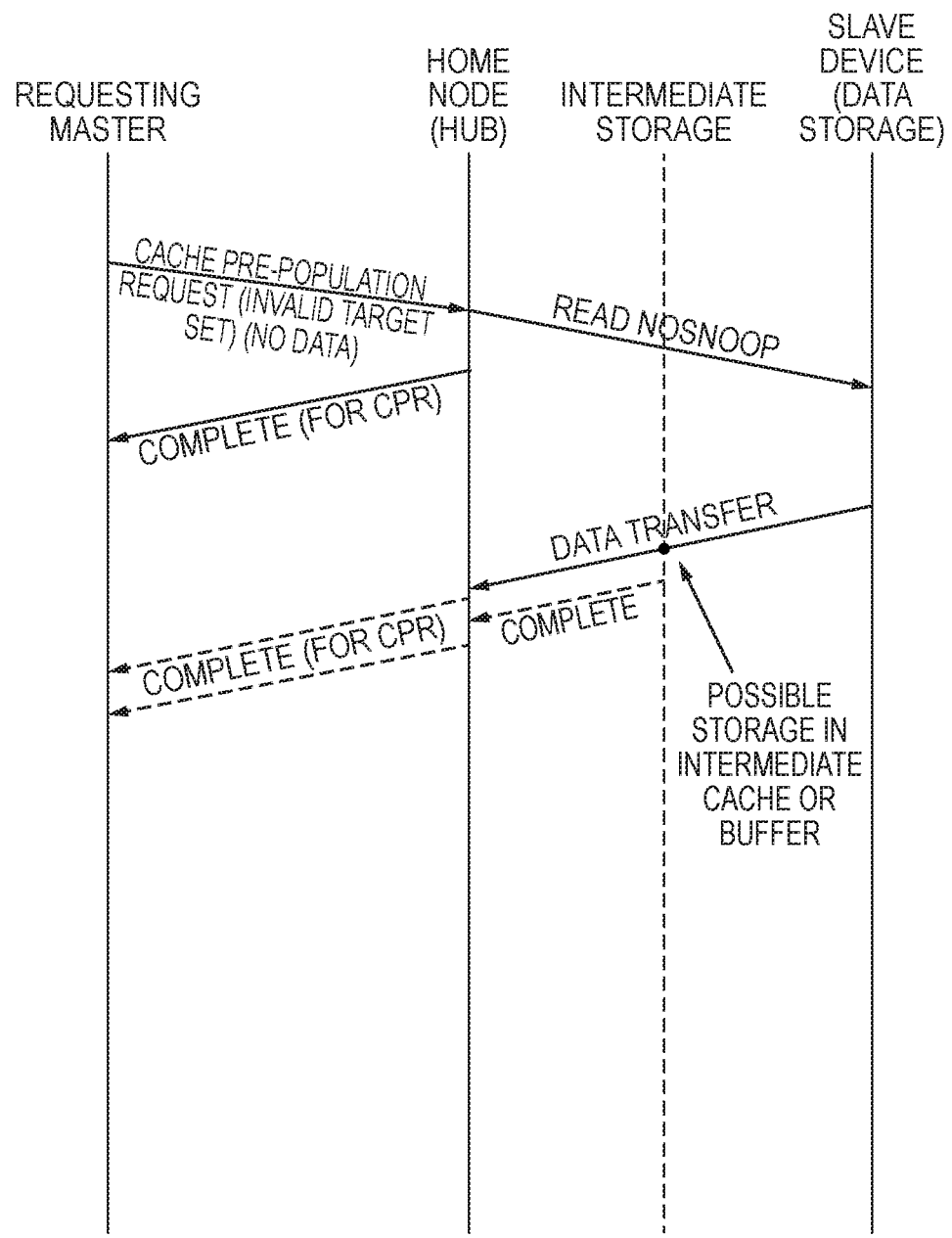
FIG. 7 shows an example of set of communication messages exchanged between a requesting master, a home node (hub device), and a slave data storage in one embodiment.

FIG. 7 shows an example in which the requesting master issues a cache pre-population request which neither specifies a target device nor provides the specified data item(s). In response to such a cache pre-population request the home node determines the location of the specified data item(s) and issues a "ReadNoSnoop" to the corresponding slave device (data storage). It then issues a complete acknowledgement to the requesting master indicating that the cache pre-population request has been acted upon. Data returned from the slave data storage device may then populate various different storage components in the system, depending on the system configuration and its current requirements. Generally, and as illustrated in FIG. 7, the slave device transmits the requested data back to the home node in response to the ReadNoSnoop request. However, as noted in the figure the system may also comprise some variety of intermediate storage (whether a cache or a buffer) which is interposed between the slave device and the home node and the returning data may instead populate that intermediate storage. The intermediate storage then signals completion of the transfer to the home node (and the data is not transmitted further). However, when the home node is the target of the data transfer the home node may then choose to store the data locally, e.g. in an associated system cache. Depending on the particular system configuration the home node may alternatively or in addition signal the completion of this entire process. Whether the data has been stored in an intermediate storage device or in a storage device associated with the home node, once the transaction is completed this may be signalled back to the requesting master.

Figure 8:
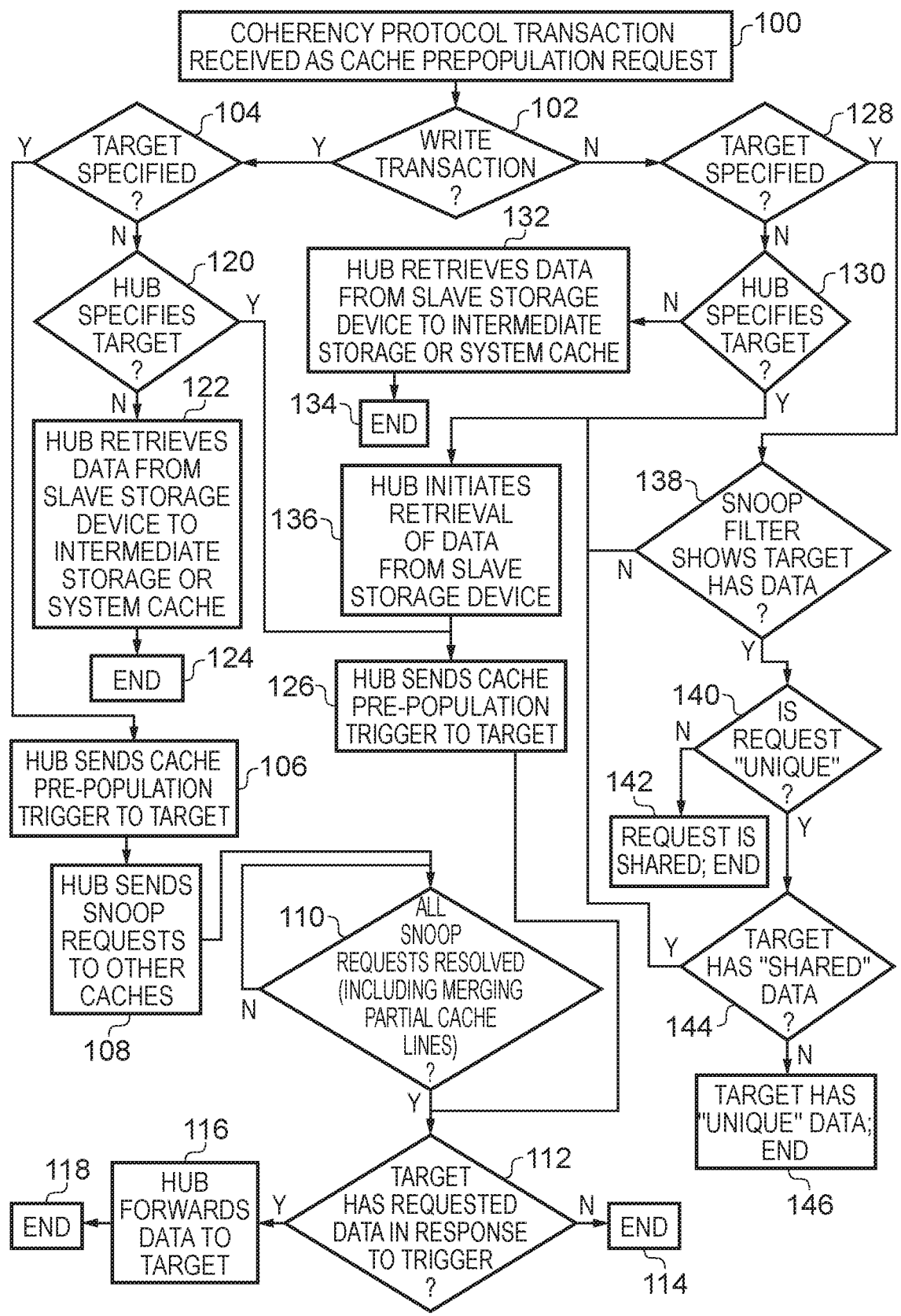
FIG. 8 shows a sequence of steps which are taken in the method of one embodiment.

FIG. 8 shows a sequence of steps which are carried out in a home node of a coherent interconnect system in the method of one embodiment. The flow begins at step 100 where a coherency protocol transaction is received by the home (hub) node which takes the form of a cache pre-population request. The flow then proceeds to step 102 where the hub determines if the request is in the form of a write transaction or not. If it is then the flow proceeds to step 104, where it is determined if a target device is specified in the request. When this is the case then the flow proceeds to step 106, where the hub sends a cache pre-population trigger to that specified target device and then at step 108 the hub sends snoop requests to other caches in the system. Those other caches will then provide snoop responses and the flow loops on itself at step 110 until all such snoop responses have been received, including merging any partial cache lines to form a full cache line temporarily buffered within the hub. Once this is done then the flow proceeds to step 112 where it is determined whether the target has requested the specified data in response to reception of the cache pre-population trigger. If it is has not then the flow simply ends at step 114, whereas if it has then the flow proceeds to step 116 where the hub forwards the specified data to the specified target and the flow ends at step 118.

Returning to a consideration of step 104, when it is determined that the write transaction does not specify a target for the cache pre-population request then at step 120 the hub determines if it can specify a suitable target. This may be done with reference to the data access patterns storage and/or snoop filter as discussed above. If it chooses not to (or cannot) then the flow proceeds to step 122, where the hub retrieves the data from the slave storage device where it is stored into either an intermediate storage device (as described above with reference to FIG. 7) or into a storage local to the hub, such as a system cache, and the flow concludes at step 124.

Returning to a consideration of step 120 if the hub then does specify a target the flow proceeds to step 126 where the hub sends the cache pre-population trigger to that target and thereafter the flow proceeds to step 112 (as described above).

Now returning to a consideration of step 102, if it is determined that the cache pre-population request is not a write transaction then the flow proceeds to step 128 where it is determined if a target is specified in the request. If it is not, then the flow proceeds to step 130 where (as described above) the hub may specify a target. When the hub does not specify a target then (step 132) the hub merely retrieves the data from the slave storage device where it is stored to an intermediate storage device or system cache (in the same manner as described above with reference to step 122). The flow concludes at step 134. If however the hub is able or chooses to specify a target at step 130 the flow proceeds to step 136, where the hub initiates retrieval of the specified data from the slave storage device where it is stored. The flow then proceeds to step 126 (as described above).

Now returning to a consideration of step 128 in the situation where the target is specified the flow proceeds to step 138 where the hub device determines if its snoop filter shows that the specified target does not currently hold a valid copy of the data. This being the case then the flow proceeds to step 136 (as described above). If however the snoop filter data does show that the specified target currently holds a copy of the specified data item(s) then it is determined at step 140 if the cache pre-population request is of the "unique" type or of the "shared" type. If the request is "shared" then the flow ends at step 142. However, when the request is "unique" then at step 144 it is determined if the target has the data stored in the "shared" coherency state, and when this is the case the flow proceeds to step 136 (as described above).

This enables the target to gain the corresponding cache line (i.e. the specified data item(s)) in a "unique" state even though it has a copy in the "shared" state. If however, it is determined that step 144 that the target has the data in the "unique" state then the flow concludes at step 146.

In brief overall summary an apparatus and a corresponding method of operating a hub device, and a target device, in a coherent interconnect system are presented. A cache pre-population request of a set of coherency protocol transactions in the system is received from a requesting master device specifying at least one data item and the hub device responds by cause a cache pre-population trigger of the set of coherency protocol transactions specifying the at least one data item to be transmitted to a target device. This trigger can cause the target device to request that the specified at least one data item is retrieved and brought into cache. Since the target device can therefore decide whether to respond to the trigger or not, it does not receive cached data unsolicited, simplifying its configuration, whilst still allowing some data to be pre-cached.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A method of operating a hub device in a coherent interconnect system comprising:
   receiving, from a requesting master device, a cache pre-population request of a set of coherency protocol transactions specifying at least one data item; and
   responding to reception of the cache pre-population request by causing a cache pre-population trigger of the set of coherency protocol transactions specifying the at least one data item to be transmitted via the hub device to a target device different from the requesting master device, wherein the pre-population trigger causes the target device to determine whether to request the at least one data item specified in the pre-population trigger to be retrieved into storage associated with the target device.

2. A hub device for a coherent interconnect system comprising:
   interface circuitry to receive, from a requesting master device, a cache pre-population request of a set of coherency protocol transactions specifying at least one data item; and
   transaction control circuitry responsive to reception of the cache pre-population request to cause a cache pre-population trigger of the set of coherency protocol transactions specifying the at least one data item to be transmitted via the hub device to a target device different from the requesting master device, wherein the pre-population trigger causes the target device to determine whether to request the at least one data item specified in the pre-population trigger to be retrieved into storage associated with the target device.

3. The hub device as claimed in claim 2, wherein the target device is a target master device comprising a cache and the cache pre-population trigger indicates that the target master device should determine whether to cause a copy of the at least one data item to be retrieved into its cache.

4. The hub device as claimed in claim 2, wherein the cache pre-population request specifies that the requesting master device has a cached copy of the at least one data item available.

5. The hub device as claimed in claim 2, wherein the cache pre-population request specifies that the at least one data item is to be retrieved from a further slave device where the at least one data item is stored.

6. The hub device as claimed in claim 5, wherein the target device is the further slave device and the cache pre-population trigger indicates that the further slave device should return a copy of the at least one data item to the hub device.

7. The hub device as claimed in claim 2, wherein the cache pre-population request specifies the target device.

8. The hub device as claimed in claim 2, wherein the cache pre-population request does not specify the target device.

9. The hub device as claimed in claim 8, wherein a field provided in the cache pre-population request to specify the target device indicates an invalid target device identifier.

10. The hub device as claimed in claim 8, wherein the transaction control circuitry is responsive to reception of the cache pre-population request to cause the cache pre-population trigger to be transmitted to a further slave device where the at least one data item is stored thereby to cause the at least one data item to be cached in a cache associated with the hub device.

11. The hub device as claimed in claim 10, wherein the cache associated with the hub device is a system cache.

12. The hub device as claimed in claim 8, wherein the transaction control circuitry is responsive to reception of the cache pre-population request to cause the cache pre-population trigger to be transmitted to a further slave device where the at least one data item is stored thereby to cause the at least one data item to be stored in a temporary storage device situated between the further slave device and the hub device.

13. The hub device as claimed in claim 8, wherein the transaction control circuitry is responsive to reception of the cache pre-population request which does not specify the target device to select the target device to which the cache pre-population trigger is transmitted.

14. The hub device as claimed in claim 13, wherein the hub device further comprises data access pattern circuitry to store data access patterns for connected master devices, and the transaction control circuitry is arranged to select the target device in dependence on the data access patterns.

15. The hub device as claimed in claim 14, wherein the data access patterns comprise indications of when the connected master devices have accessed data represented in the data access patterns.

16. The hub device as claimed in claim 14, wherein the hub device further comprises snoop filter circuitry to store indications of cached data for connected master devices, and the transaction control circuitry is arranged to select the target device in dependence on the indications of cached data.

17. The hub device as claimed in claim 7, wherein the hub device further comprises snoop filter circuitry to store indications of cached data for connected master devices, and the transaction control circuitry is responsive to an indication that the target device currently has a valid cached copy of the at least one data item to suppress transmission of the cache pre-population trigger to the target device.

18. The hub device as claimed in claim 2, wherein the cache pre-population request specifies a coherency state with which the at least one data item is to be labelled when cached.

19. The hub device as claimed in claim 18, wherein the coherency state is a modifiable state indicating that, when the at least one data item is cached, the at least one data item is allowed to be updated without further exchange of coherency protocol transactions with the coherent interconnect system.

20. The hub device as claimed in claim 18, wherein the coherency state is a non-modifiable state indicating that, when the at least one data item is cached, further exchange of coherency protocol transactions with the coherent interconnect system is required before the at least one data item is allowed to be updated.

21. A system comprising:
the hub device of claim 2;
the requesting master device; and
the target device,
wherein:
   the requesting master device and the target device are connected together via the hub device; and
   communication and data transfer between the requesting master device and the target device is mediated by the hub device.

* * * * *